Feb. 18, 1930. J. O. GARGAN 1,747,233

TUNING DIAL

Filed July 30, 1929

INVENTOR
J. O. GARGAN
BY J. MacDonald
ATTORNEY

Patented Feb. 18, 1930

1,747,233

UNITED STATES PATENT OFFICE

JOHN O. GARGAN, OF BROOKLYN, NEW YORK, ASSIGNOR TO BELL TELEPHONE LABORATORIES, INCORPORATED, OF NEW YORK, N. Y., A CORPORATION OF NEW YORK

TUNING DIAL

Application filed July 30, 1929. Serial No. 382,098.

This invention relates to tuning dials for radio transmitting or receiving sets.

The object of this invention is to provide a dial which will be simple, cheap to manufacture and wherein the pointer may be readily set in a number of predetermined positions on the dial in a minimum of time.

According to this invention a number of adjustable arcuated plates or rings are provided each having a depression, spring pressed balls on the pointer cooperating with these depressions to readily pick out the desired wave lengths. A micrometer mechanism is also provided for moving the index in respect to other wave lengths appearing on the dial. Fastening means are provided for securing the pointer in adjusted position along the whole range of the dial for effectively maintaining the adjustment of the set when transmitting or receiving signals on wave lengths occurring at points intermediate the position defined by the detent devices.

Figure 1:
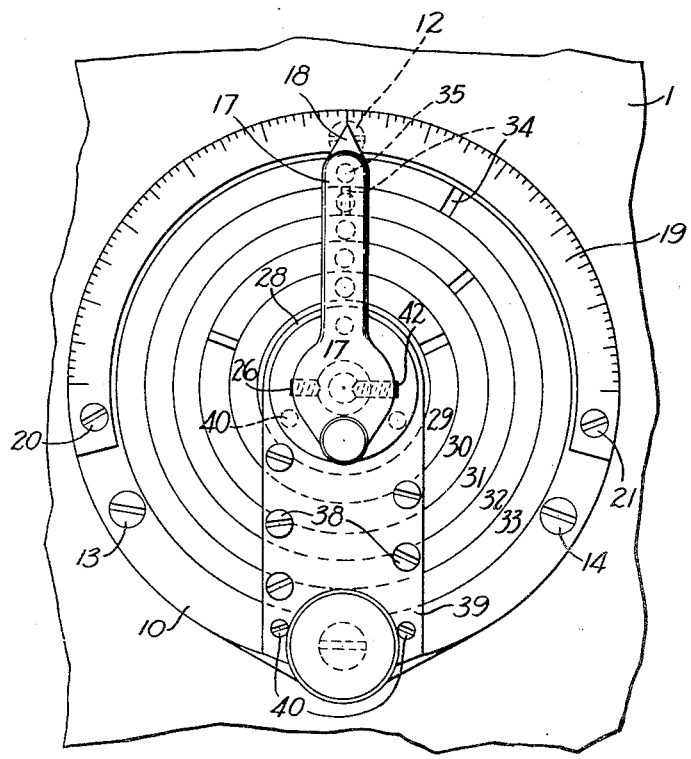
Figure 2:
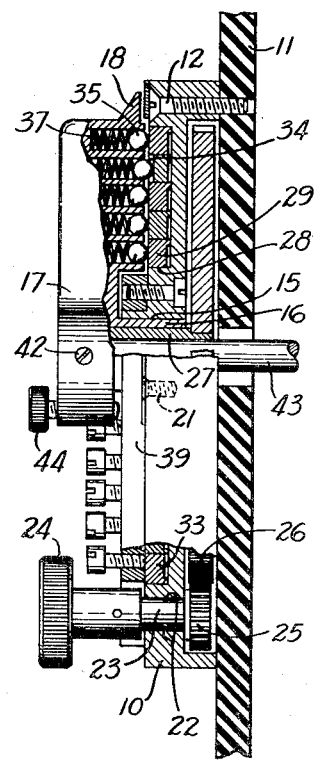
Figure 3:
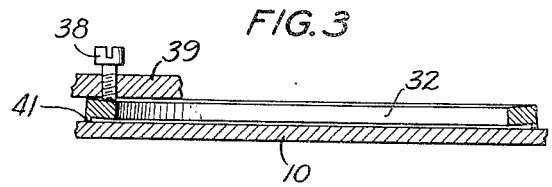

Other features of the invention will appear from the following description and by the appended claims, reference being had to the accompanying drawings in which Fig. 1 is a front elevation of the dial, Fig. 2 is a side view thereof partly in section, and Fig. 3 is a detail view of a fastening device used in the dial of this invention.

As shown in Figs. 1 and 2 the tuning dial consists of a plate 10 which may be secured to a panel or board 11 by screws 12, 13 and 14. The plate 10 has a central opening 15 which serves as a bearing for the hub or sleeve portion 16 of an arm 17. This arm carries a pointer 18 disposed in juxtaposition to the face of a graduated dial 19 which is secured in position on the plate 10 by screws 20 and 21. In the lower part of plate 10 there is provided an aperture 22 which serves as a bearing for a shaft 23 which carries at one end a knob 24 and at its other end a pinion 25. This pinion meshes with a gear 26 secured on one end of hub 27 which fits the hub 16 of arm 17, the hub 27 being secured to arm 17 by a set screw 26 for moving the arm 17 on the face of dial 19 through the rotation of knob 24.

On bearing portion 28 of plate 10 there is mounted in concentric arrangement a number of independently adjustable rings 29, 30, 31, 32 and 33, each provided with a notch or recess such as 34, provided for a purpose which will be hereinafter described in detail.

The arm 17 carries a number of balls such as 35, arranged to engage through the pressure exerted by springs 37, the recesses 34 of their respectively associated rings 29, 30, 31, 32 and 33 for holding the arm 17 in position with respect to a corresponding number of marks on the dial 19. These rings are secured in adjusted position by means of screws such as 38 mounted on a plate 39 which is in turn secured on the plate 10 by screws 40.

Rings 29, 30, 31, 32 and 33 are each provided with a rim portion 41 shown in Figs 2 and 3 which permits the torsional movement of the rings under the action of screws 38 for holding the rings firmly against the face of plate 10 as shown in Fig. 3.

The shaft 43 of the rotating device such as a condenser rotor may be operatively connected to the arm 17 by a set screw 42 threading through the arm 17, the hub 27 of gear 26, and hence in engagement with the shaft 43.

For the tuning dial of this invention the setting of rings 29, 30, 31, 32 and 33 in place corresponding to different wave lengths as defined by the position of the arm 17 on the marks of dial 19 is as follows. With the screws 38 disengaged from their respective rings, pointer 17 is first moved on the dial in position at which it is desired to receive a signal. The ring 32, for example, is moved around in position wherein its notch 34 is engaged by the ball 35 under the tension of spring 37. The screw 38 of that ring is then screwed tightly against the inner peripheral edge of the ring which forces it to take the shape shown in Fig. 3, wherein the ring is positively held against rotation against the face of plate 10. Similarly the adjustment of the other rings 29, 30, 31 and 33 is effected as above described in connection with ring 32 thus permitting the adjustment of the detent devices in such a manner that the pointer is held in adjusted position irrespective of the proximity at which two different wave lengths occur on the dial. In this device, the arm 17 may be secured in position intermediate the notches 34 in the rings by means of a thumb screw 44 which threads through the arm 17 in engagement with the face of plate 39. With the rings 29, 30, 31, 32 and 33 set in the positions above described, the arm 17 and the rotor of the tuning apparatus such as at the rotor plates of a condenser controlled thereby may be moved easily and retained in a positive manner in position as defined by the occurrence of the notches 34 and the spring pressed balls 38. Similarly the pointer 17 may be moved accurately in places intermediate the notches in the rings through the operation of knob 24 and gears 25 and 26 which constitute a micrometer adjusting mechanism. The arm 17 and pointer 18 carried thereby may be secured in any position by knob screw 44 above referred to.

What is claimed is:

1. In a tuning device, a pointer, a support, a plurality of detent means carried by said pointer, a plurality of adjustable rings mounted on said support, each having means cooperating with said detent means for holding the pointer in its set position, and means for securing said rings in adjusted position on said support.

2. In a tuning device, a support, an index pivoted on said support, a plurality of rings mounted in concentric relation on said support, and capable of adjustment, one with respect to the other, detent means carried by said index, and a recess in each of said rings for engagement with the detent means.

3. In a tuning device, a plate, a graduated dial mounted on said plate, an index, a gear train for actuating said index, a plurality of spring-pressed plungers carried by said index, and an adjustable notched member for each of said plungers for holding the index in predetermined positions with respect to marks on said dial.

4. In a tuning device, a plate, a graduated dial mounted on said plate, an index movable over said dial, a gear carried by said index, a pinion engaging said gear, a knob carried by said pinion for actuating the index, means for holding the index in predetermined position with respect to marks on said dial and other means for securing the index at points intermediate the position of said detent means.

In witness whereof, I hereunto subscribe my name this 29th day of July, 1929.

JOHN O. GARGAN.